United States Patent
Dell et al.

(10) Patent No.: US 7,416,514 B2
(45) Date of Patent: Aug. 26, 2008

(54) METHOD AND SYSTEM FOR CONTROLLING AT LEAST ONE ACTUATOR IN THE DRIVE TRAIN OF A MOTOR VEHICLE

(75) Inventors: Heiko Dell, Bühlertal (DE); Klaus Küpper, Bühl (DE); Alexander Schweizer, Walzbachtal-Jöhlingen (DE); Dietmar Lang, Höheischweiler (DE); Jürgen Benz, Oberkirch (DE); Reinhard Berger, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 137 days.

(21) Appl. No.: 10/498,385

(22) PCT Filed: Oct. 10, 2003

(86) PCT No.: PCT/DE03/03358

§ 371 (c)(1),
(2), (4) Date: Sep. 30, 2005

(87) PCT Pub. No.: WO2004/036079

PCT Pub. Date: Apr. 29, 2004

(65) Prior Publication Data

US 2006/0155435 A1  Jul. 13, 2006

(30) Foreign Application Priority Data

Oct. 11, 2002 (DE) .................. 102 47 517

(51) Int. Cl.
 *B60W 10/02* (2006.01)
 *B60W 10/06* (2006.01)
 *B60W 10/10* (2006.01)
(52) U.S. Cl. ........................... 477/80; 192/3.63
(58) Field of Classification Search ............ 477/70, 477/80, 86
See application file for complete search history.

(56) References Cited

U.S. PATENT DOCUMENTS

| 4,621,328 A | 11/1986 | Arai et al. ............. 701/52 |
| 4,825,993 A | 5/1989 | Kurihara et al. ........ 477/80 |
| 6,364,809 B1 | 4/2002 | Cherry ................... 477/86 |

FOREIGN PATENT DOCUMENTS

| EP | 0 461 578 A1 | 12/1991 |
| EP | 0 599 511 A1 | 6/1994 |
| EP | 0 997 659 A1 | 5/2000 |
| WO | WO 02/18814 A1 | 3/2002 |

*Primary Examiner*—Sherry Estremsky
*Assistant Examiner*—Edwin A Young
(74) *Attorney, Agent, or Firm*—Alfred J. Mangels

(57) ABSTRACT

The invention relates to a method and device for securely and comfortably operating a drive train of a motor vehicle, especially for operating a drive train with several clutches.

5 Claims, 5 Drawing Sheets

US 7,416,514 B2

METHOD AND SYSTEM FOR CONTROLLING AT LEAST ONE ACTUATOR IN THE DRIVE TRAIN OF A MOTOR VEHICLE

BACKGROUND OF THE INVENTION

1. Field of the Invention

The present invention relates to a method and apparatus for controlling at least one actuator in the drive train of a motor vehicle, especially a motor vehicle that is equipped with an automated twin-clutch transmission.

2. Description of the Related Art

Automated drive trains in which the clutch and/or the transmission are actuated by actuators in accordance with predetermined programs are increasingly used in passenger cars. Such transmissions not only increase driving comfort, but also enable considerable improvements in fuel consumption at low speed operation.

A portion of a drive train of such a vehicle is illustrated in FIG. 1a.

A twin-clutch transmission, also called a parallel shift transmission, which has been generally designated with the reference numeral 10, includes two input shafts 12 and 14, each of which can be connected via a clutch 16 and 18, respectively, to the crankshaft 20 of an internal combustion engine. Arranged on the input shafts 12 and 14 are gears that can mesh with gears that are displaceably and non-rotatably arranged on an output shaft 15 for the purpose of shifting different gears.

An actuator 24 and 26 is associated with each clutch 16 and 18, respectively, for the actuation thereof.

The actuation arrangement for actuator 26 is shown in greater detail and includes an electric motor 30, the output pinion 32 of which includes an internal thread, which meshes with a threaded rod 34 that simultaneously acts as the rod of a piston 36 that operates in a hydraulic cylinder 38. The hydraulic cylinder 38 is connected to an actuating member, for example, a release lever of the clutch 18 via a hydraulic pressure transmitting path 40. To detect the position of the piston 36 and/or of the release lever of the clutch 18, a sensor 42 is included, which detects the angle of rotation of the output pinion 32. Changes in the angle of rotation allow a conclusion that linear displacement of the threaded rod 34 has taken place, due to the engagement between the pinion 32 and the threaded rod 34. In order to obtain a reference position, which can be referenced during displacement of the piston 36, an expansion port in the hydraulic cylinder 38 can be crossed in a known manner, causing pressure, during said crossing, to be built up in the hydraulic pressure transmitting path 40, which can be detected through an increase in the torque and/or power consumption of the electric motor 30. Pressure points or stops of the clutch can be used as additional reference positions.

The gears that are arranged on the output shaft 15 of the twin-clutch transmission 10 are moved axially by means of shift forks 46 (see FIG. 1b), which act together with shift fingers 48 that are arranged on a selector shaft 50. For example, one selector shaft 50 can be provided with several shift fingers 48 for actuating all gears that are arranged on the output shaft 15, or two selector shafts 50 can be arranged to actuate the shift forks of those gears that are associated with one of the input shafts, respectively. For each selector shaft 50, two actuators are provided—one that rotates the selector shaft 50 back and forth around its axis in order to engage the gears, and another that displaces the selector shaft 50 axially, in a direction perpendicular to the plane of the paper showing FIG. 1b, so as to select among different switching paths.

The actuators associated with a particular selector shaft 50 have been designated by reference numerals 52 and 54 in FIG. 1a. Position detection can occur in a similar fashion to that shown for the electric motor 30 through increment counters. In order to recognize the absolute position of the selector shaft 50 and/or of the shift finger 48, reference positions must be encountered—for example, stops on a selection path and switching paths or stops that are encountered by the shift forks 46 themselves.

To control the above-mentioned actuators, a control arrangement and/or control device 60 is provided, the inputs of which are connected to various sensors that are useful for controlling the operation of the various actuators, and the outputs of which are connected to the actuators. The control device 60 includes a microprocessor 62 having a program memory 64 and a data memory 66.

The design and the function of the described arrangement are known and will therefore not be explained in detail. During operation in practice, several problems exist with respect to the operating comfort and functional safety of the arrangement. Those problems are solved by means of the present invention.

SUMMARY OF THE INVENTION

Briefly stated, in accordance with one aspect of the present invention a method is provided for referencing a component that can be moved by an actuator in a motor vehicle, wherein the movement of the component relative to a reference position is recorded. The component is moved by the actuator in its reference position when an actuating component of the vehicle is activated during normal operation prior to any activity by the actuator.

DESCRIPTION OF THE PREFERRED EMBODIMENTS

Figure 1:
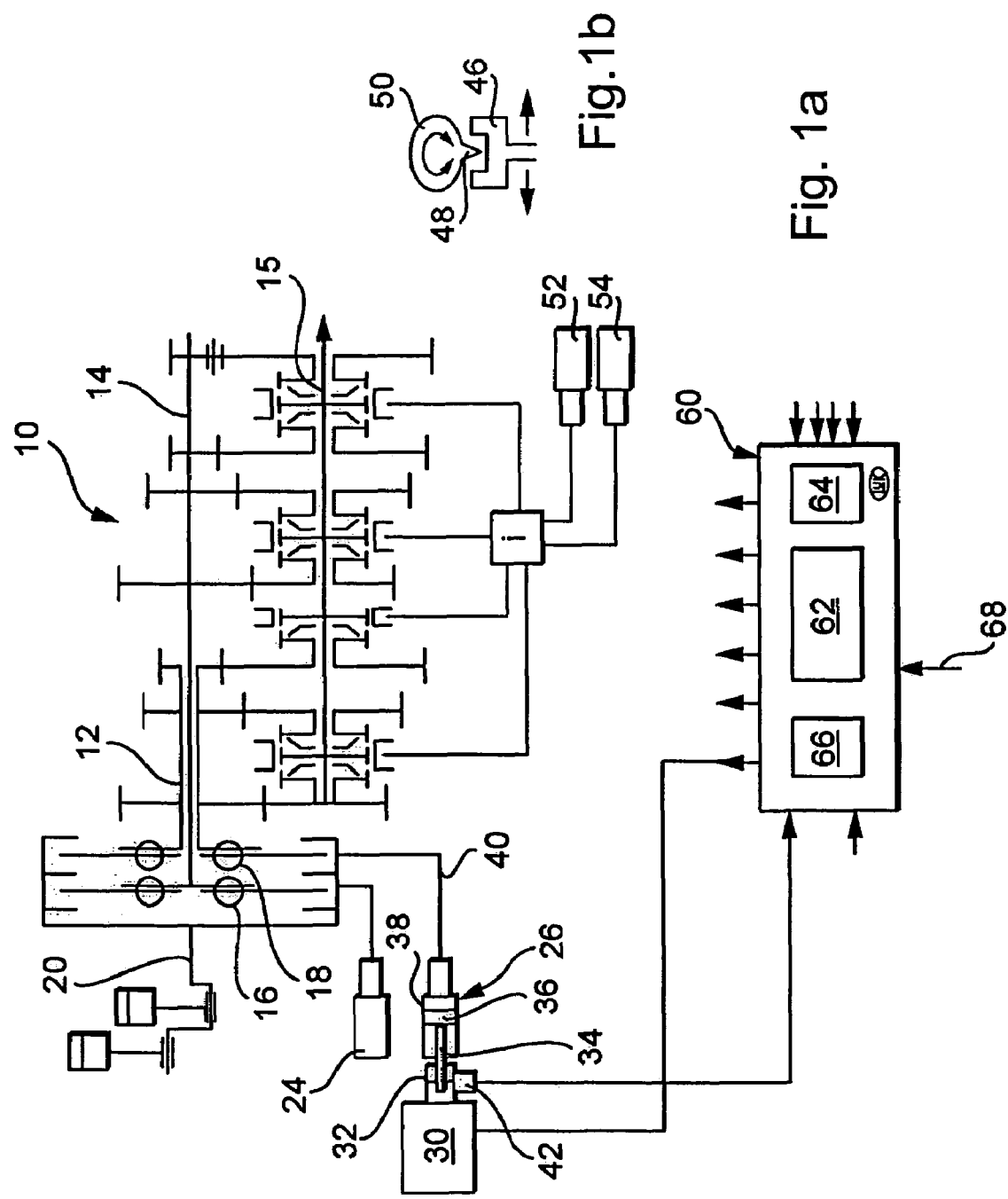
FIG. 1a is schematic diagram showing a portion of a drive train of a motor vehicle.
FIG. 1b is a fragmentary end view of a selector shaft and shift fork.

A first problem is that data stored in the data memory 66 regarding the absolute position of the individual actuators and/or actuating elements for the clutches and the selector shafts can be lost, so that, especially after turning the ignition on, renewed referencing is required, for which the reference and/or orientation positions must be selected based upon which of the absolute positions of the individual actuators is then known. After turning off the ignition, for example, the two gearbox units included in the twin-clutch transmission are switched to neutral and the appropriate clutches 16 and 18 are engaged. Irrespective of whether the vehicle is shut off in the neutral position of the transmission or with one or more engaged gears, the state of the transmission must be checked prior to starting and/or after turning the ignition on again, as the possibility that gears in the transmission were engaged or disengaged between turning the ignition off and turning it back on cannot be excluded.

In a verification process of the transmission actuator or actuators, the transmission actuators encounter reference positions while controlled by the control device 60, and based upon those positions an absolute path determination of the transmission actuator or actuators is then made possible. Upon conclusion of the referencing operation, the control device, for example, checks whether both gearbox units (the corresponding selector shafts 50) are switched to neutral or whether gears are still engaged. If necessary, it is also possible to ensure that the physical position of a transmission actuator was not modified after last turning the system off—for example, by replacing components.

The described referencing operation of the transmission actuators after "ignition on" is particularly important if the transmission actuators also actuate a parking brake. In that case, the transmission actuators must not perform any action before the referencing operation has been completed, as otherwise the danger exists that the parking brake can be accidentally released through the motions of the actuators. Possible actions by the driver, such as the command to start the engine or moving the selector lever into the "D" position, are ignored by the control device 60 until the referencing operation of the transmission actuators has been completed. That can lead to a time delay, which the driver perceives to be uncomfortable.

To eliminate that time delay, a method in accordance with the present invention is provided for referencing a component in a motor vehicle actuated by an actuator, wherein the movement of the component relative to a reference position is detected. In that method the component is moved by the actuator into its reference position when an operating part of the vehicle is actuated, which during normal operation takes place before activity by the actuator occurs.

The component that has been moved to its reference position can be, for example, a control element of a clutch or a control element of a transmission, especially a twin-clutch transmission.

The method in accordance with the present invention, which can be applied to various components that are moved by actuators, ensures, in the present case, that the referencing operation occurs even prior to turning the ignition on, and/or prior to the immediate start of the vehicle by the driver. In that way the clutch and/or the transmission are directly ready for operation, i.e., they react immediately to the driver's control commands when the driver issues those commands. To ensure that the referencing operation occurs in time, an input 68 of the control device 60 is connected to a control element of the vehicle that is actuated prior to the activity of the respective actuator during normal operation—for example, a door switch, a switch responding to a remote control, a brake pedal switch, a switch in the ignition lock that responds to insertion of the ignition key, a selector lever actuating switch, a switch that responds to the driver approaching the vehicle in "keyless go" systems, etc.

When a signal appears at the input 68, that signal is a wake-up signal for the control device 60, based whereon a referencing operation of the positions of the respective actuators and an evaluation regarding the gear position of the transmission occur. When the driver then turns on the ignition, driver commands—such as a change in the selector lever position, a starter release to start the engine, etc.—can be implemented immediately, wherein it may be necessary for the clutches to be previously engaged. The described method can be applied in all areas where no absolute path measurement occurs and where referencing is required to have information about the position of an actuator.

Another problem that occurs especially in automated twin-clutch transmissions is that, as described, no sensors that measure the absolute position of the shift finger or fingers 48 and the shift forks 46 are included, so that it is possible that information regarding the current position of the shift finger and/or shift fork, which is stored in the data memory 66, will be lost due to interfering influences.

Moreover, in an "active interlock" system, no direct coupling exists between the shift finger and the shift forks, so that it is impossible to assume that a gear is, in fact, disengaged when the shift finger is located in the so-called neutral region, i.e., in the neutral path. For detailed explanations of "active interlock" systems reference is made to DE 102 06 561 A1. Of course, in accordance with the idea of the present invention, certain functions, such as a neutral detection through a partial engagement of the clutch, can be advantageous even without the use of an "active interlock" system.

There are situations in which it must be absolutely ensured that the transmission is in neutral, for example during an automatically occurring balancing operation and/or a volume compensating process in the hydraulic transmission path 40, with external clutch engagement while the vehicle is at rest or being towed. Accordingly, an additional object of the invention is to provide possibilities for safe verification of whether the transmission is in the neutral position.

That object is achieved by means of a method for detecting whether the transmission of a vehicle at rest with a disengaged clutch, wherein the transmission is connected to a vehicle engine via a clutch that is actuated by an actuator, is in the neutral position, wherein in that method a) the clutch is engaged to a predetermined extent from its disengaged position, b) during engagement of the clutch the rotational speed of the engine is determined, c) a speed reduction is interpreted as a transmission that is not in neutral and leads to a renewed disengagement of the clutch, or d) the absence of a speed reduction is interpreted as a transmission that is in neutral.

Steps a) through d) preferably occur continuously, wherein after each step d) a gearshift component of the transmission is displaced by a predetermined amount until the method has arrived at step d).

The above-described method can be employed in transmissions operating with one clutch, and especially advantageously in twin-clutch transmissions, in which dangerous operating conditions and overloads in the transmission can occur upon engaging the clutches when transmissions are accidentally not in the neutral state. Of course, instead of directly determining the rotational speed or its change during the partial engagement of the clutch, it is also possible to detect and evaluate other variables that are dependent thereupon and that allow a conclusion of the change in the load condition of the engine, such as a change in torque or a change in the intake or exhaust volumetric flow.

One way of executing the above-described method for the system illustrated in FIG. 1a includes, for example, arranging for a sensor (not shown) to inform the control device 60 that the vehicle is at rest and the engine, for example, is running at idle. Additionally, whether the brake pedal (not shown) has been actuated can be detected. If it is necessary to check whether the transmission is in neutral—for example, automatically while a routine balancing operation is conducted or while a towing switch is actuated—then, upon the existence of the above-described conditions, one of the clutches 16 or 18 is slowly engaged to a certain clutch torque—for example, a reference point at which a torque of 9 Nm can be transmitted. If a gear is engaged with the corresponding input shaft, the load condition of the engine changes, e.g., the engine rotational speed drops or the idle controller of the engine increases the engine torque to control the rotational speed. After a drop in rotational speed or another variable dependent upon the changed load condition of the engine has been detected, the clutch is immediately disengaged again to prevent the engine from stalling. If no more fluctuations in the engine exist, the corresponding input shaft rotates freely and the speed does not drop. For the above-described verification process, the clutch should obviously not be engaged to its contact point, as that point could have shifted.

After the above-described verification process of the one clutch, the other clutch is checked correspondingly.

In a further development of the above-described method, the transmission can be put in neutral by displacing the selector shaft and/or selector shafts in steps after renewed complete disengagement of the respective clutch whenever the engine rotational speed drops, and subsequently checking whether the drop in rotational speed still exists. If no further drop in rotational speed exists, the transmission is in neutral, wherein the neutral position determined in that way can be stored as a reference value for the selector shaft or selector shafts.

With an active interlock, the above-described method can replace the neutral reference travel of the automatic transmission.

Another problem occurring in vehicles with twin-clutch transmissions is that, generally speaking, when a gear is engaged in both gearbox units, only one clutch is completely engaged, as otherwise constraints may occur. When shifting or starting, both clutches are generally only partially engaged. When shutting the system off while the vehicle is at rest, both clutches are completely engaged. This is particularly the case in conventional dry clutches with hydraulic release systems for relief of the hydraulic system. If, during engagement of the clutches in both gearbox units, i.e., between each input shaft and output shaft, a gear is engaged and the vehicle is not at rest, very high drive train torque values can occur, as the two gearbox units constrain each other. If that occurs accidentally it can lead to dangerous driving situations.

The present invention has the further object of providing a remedy for that problem.

The problem is solved by means of a method for engaging the clutches of a twin-clutch transmission arranged between an engine and driven wheels of a motor vehicle, whereby the engine is at rest, including the following steps:

a) slowly engage one clutch, b) detect the transmission input rotational speed or the engine rotational speed during the slow engagement of one clutch, and c) cancel the continued engagement of the clutch when the detected rotational speed exceeds a predetermined value.

After step c), the transmission is advantageously shifted into the neutral position.

Moreover, it is advantageous to continue to detect the rotational speed after step c) and to completely engage the clutch when the rotational speed drops below a predetermined value.

In another embodiment of the method, after step c)

d) the clutch is disengaged, e) the other clutch is slowly engaged, f) the transmission input rotational speed or the engine rotational speed is detected while slowly engaging the other clutch, and g) the continued engagement of the other clutch is canceled when the detected rotational speed exceeds a predetermined value.

It is advantageous to shift the transmission into the neutral position after step g).

In another preferred embodiment, the rotational speed continues to be detected after step g) and the other clutch is completely engaged when the speed drops below a predetermined value.

Thus, in accordance with the present invention, the clutches of the twin-clutch transmission are slowly engaged one after the other, instead of engaging them simultaneously. That results in the following sequence when a situation occurs in which both clutches are supposed to be engaged (for example when the vehicle is completely at rest).

The clutch of one gearbox unit (clutch 16 or 18 in FIG. 1*a*) is slowly engaged, over a period of, for example, between 0.5 and 20 seconds, typically over a period of 3 seconds.

If, during that process, with a previously turned off engine, an increase in the engine rotational speed or the input rotational speed of the corresponding input shaft is detected, then contrary to expectations a gear is still engaged. Engagement of the clutch can then be canceled, and an attempt can be made to disengage the gear, or the engagement of the clutch can possibly be continued more slowly so as to slow down the vehicle through the action of engine braking torque.

The other clutch is subsequently slowly engaged in a similar fashion.

The transmission input rotational speed and/or the engine rotational speed is also monitored while the other clutch is being engaged. As soon as it exceeds a certain limit, the same processes take place as explained above for the first clutch.

Alternatively, the one clutch can initially be engaged and the rotational speed can be monitored. Then that clutch is disengaged and the second clutch is engaged. Only when the second clutch has been engaged completely without detecting a rotational speed will the first clutch be, in turn, engaged completely, thus achieving the desired final state.

The above-described strategy allows transmittable torque of the clutches, and hence the torque in the drive train, to be built up slowly. Furthermore, it offers the possibility of detecting erroneous and/or undetected starting conditions, such as an engaged gear or a moving vehicle. In that way, counter-measures can be initiated, and critical situations can be prevented. The above-described processes frequently occur during a slowing down of the control device, whereby the control device does not shut off immediately when the ignition is shut off, but only when the above-described activities have been completed.

Automated transmissions, especially twin-clutch transmissions that are equipped with a "park by wire" system, contain no mechanical connection between the selector lever of the transmission and the mechanism that engages the parking brake physically, i.e., directly. The parking brake can be, for example, a mechanical blocking of the rotatability of the transmission output shaft, which is actuated by an actuator of the transmission. Engagement of the parking brake is especially important, as malfunctions in the parking brake can quickly lead to situations that are critical to safety. The system must therefore guarantee that the parking brake is actually engaged when the driver requests it, or, in case of possible malfunctions, a clear indication of the malfunction must occur. In addition, the driver should always be clearly informed of the actual status of the parking brake. The selector lever and/or its operability, as well as the display of the status of the transmission, especially its shift state in "P," are therefore subject to special requirements.

One possibility is to execute the selector lever as a touch switch with a fixed resting position, to which it always returns upon actuation. Indication regarding the shift status of the transmission occurs by means of a display. The display is controlled by the transmission control device, which also controls the actuators of the transmission. If the driver actuates the selector lever in order to engage the parking brake, and if that brake cannot be engaged for any reason, the display will not show "P," but instead, for example, will flash, or will visually or acoustically alert the driver to the error.

In accordance with the invention, the above-described problem of the particularly safe functionality of the "P" status is generally solved by means of a method for controlling the movability of a selector lever in an automatic transmission. In that method it is possible to move the selector lever out of a predetermined shift position (for example, the "P" position) or into a predetermined shift position (for example, the "P" position) only when the transmission has been shifted out of the shift status corresponding to the predetermined shift position or into the shift status corresponding to the predetermined shift position. The locking and/or unlocking process of the selector lever is directly controlled by the transmission control device, so that the appropriate functionality is guaranteed with certainty. The selector lever can be locked in the "P" position, for example, by ensuring that the selector lever is elastically pressed out of the "P" position as long as the parking brake has not been engaged, and is locked in the "P" position, for example by means of a pin that can be moved magnetically and latches into a corresponding opening of the selector lever, wherein the pin is not moved until the parking brake has been engaged. To ensure that the selector lever can only be moved out of the "P" position when the parking brake has been released, upon actuation of the selector lever in one or the other direction, the pin that is latched with the selector lever can be pressed against stops, which form electrical switches and, upon closing, trigger a release of the parking brake, wherein the pin is moved out of the position that blocked the selector lever's ability to move.

Another problem that arises especially with twin-clutch transmissions that are equipped with a "park by wire" system, is, as described, to ensure that the parking brake is in fact flawlessly engaged.

To ensure that this occurs with certainty, the invention provides a method for shifting a twin-clutch transmission into the "P" position, wherein, in that method, after a command to shift the transmission into the "P" position, a referencing process of at least one transmission actuator that engages a parking brake is performed, and the transmission is only shifted into the "P" position after the referencing has occurred.

Referencing is advantageously also performed after the vehicle had been shut off and the ignition is turned back on. Additionally, it must be ensured that, when the parking brake is engaged, possible movements by the transmission actuator in the transmission do not mistakenly release the parking brake. To avoid erroneous release of the parking brake, a special release geometry must be used, which the transmission actuator must follow in order to release the parking brake.

In a parallel shift transmission, especially one with active interlock, the shift into neutral is also significant from a safety-related point of view. It is therefore advantageous to initially perform a gear referencing operation, also before shifting into neutral, so that both gearbox units are in fact shifted into neutral with sufficient certainty.

Parallel shift transmissions in general require special measures for their safe and comfortable, i.e., especially prompt, ability to shift out of individual operating states of the vehicle. Accordingly, the present invention is furthermore based upon the object of defining gear shift conditions in which the motor vehicle can be operated especially advantageously, starting from various vehicle conditions.

A first solution of that task includes a method for controlling the operation of a twin-clutch transmission of a motor vehicle, wherein the clutches and gearboxes of the twin-clutch transmission are shifted into conditions corresponding to the following pattern for the vehicle status "ignition on, engine on, and vehicle at rest":

Vehicle is at rest with ignition on and running engine

| Vehicle Status: | | Ignition on<br>Engine on<br>Vehicle at rest | | |
|---|---|---|---|---|
| | | Selector Lever | | |
| | D | R | N | P |
| Gearbox 1 | 1 | 1/N | N | 1 P active |
| Gearbox 2 | 2 | R | N | 2 P active |
| Clutch 1 | Disengaged | Disengaged | Disengaged | Disengaged |
| Clutch 2 | Disengaged | Disengaged | Disengaged | Disengaged |

In this vehicle status, both clutches (clutches 16 and 18 in FIG. 1a) are disengaged regardless of the selector lever's position.

In the "D" position of the selector lever, in accordance with the pre-selection strategy stored in the control device, the $1^{st}$ and $2^{nd}$ gears are engaged in order to enable spontaneous driving after release of the brake. When the brake is released without actuating the gas pedal, the vehicle slowly starts to drive. In the "R" position, the reverse gear is engaged.

When the selector lever is in the "P" position, both gearbox units are in the pre-selected gears (1 and 2) and the parking brake is activated. In that way, a spontaneous reaction is achieved when moving the selector lever from P to D. With the pre-selected gears 1 and 2, the vehicle is immediately ready for driving when the parking brake is deactivated. If, as is known from the prior art, both gearbox units were in neutral, then, in order to change from P to D, gears 1 and 2 would first have to be engaged, and only then could the parking brake be released, which would lead to a time delay.

Given the pre-selected gears 1 and 2 in P, in order to change from P to R, the reverse gear initially has to be engaged, and then the parking brake must be deactivated, which causes a small delay. However, the driver will be more apt to accept this in the case of the reverse gear, as he will have to turn his head or look in the rearview mirror.

The following optional pre-selection strategies are also feasible:

Pre-selection strategy in which gears 1 and R or 2 and R (irrespective of which gearbox unit is assigned to the reverse gear) are engaged in the "P" position of the selector lever. In that way, spontaneous driving is possible when changing both from P to D and from P to R. Proceeding from that pre-selection strategy, however, both gearbox units would always be operated in different directions of rotation, which requires special safety measures.

In another pre-selection strategy, only the $1^{st}$ gear is engaged in the "P" position of the selector lever. The shift finger in the "active interlock" is placed in front of the position of the reverse gear. When a driving shift from P to R occurs, the reverse gear can be engaged immediately; when the change occurs from P to D, the driver can start in the $1^{st}$ gear and then the $2^{nd}$ gear can be engaged parallel.

Due to the listed pre-selection strategies for both gearbox units with a selector lever in the "P" position, both clutches must remain permanently disengaged. That condition can take a longer period of time, during which the pressure in the hydraulic path can change for semi-hydraulically actuated clutches. The contact point of the clutch would then change and the subsequent start could be uncomfortable. Accordingly, in such release systems, periodic pressure compensation of the hydraulic pressure transmitting path must take place, i.e., a so-called balancing process. To do so, the corresponding gearbox unit must be shifted into neutral and the appropriate clutch must be temporarily engaged in order to disengage the clutch again after the balancing process and re-engage the original gear. That procedure can be performed successively for both clutches and gearbox units, or simultaneously for both gearbox units. In the "N" selector lever position, both gearbox units are in neutral, so that a balancing process can be conducted at any time.

During the shift from D to P when the engine is running, the parking brake is engaged and the pre-selected gears remain engaged. During the shift from N to P, the parking brake is initially activated and gears 1 and 2 are subsequently engaged in the corresponding gearbox units. Engagement of the parking brake has priority over engagement of the gears in that process. During the shift from P to N, the parking brake is initially released and both gearbox units are subsequently shifted into neutral. However, as soon as the parking brake has been disengaged, the driver has the impression that neutral has been activated in the drive train, since the clutches are disengaged. Here as well, release of the parking brake has priority over neutral in both gearbox units.

For reasons of safety, the shift from P to D and from P to R, and the shift from N to D and from N to R, as well as from P to N, can be performed only when the brake pedal has been pushed. If a shift from the "N" position to D or R occurs, additional conditions such as the time spent in N must be taken into consideration. If the dwell time in N is less than a predefined duration, for example 500 ms, no braking is required. That is advantageous for the possibility of releasing the vehicle during a quick change from D to R and vice versa.

Obviously, in the above pattern, contact point adaptations of the clutches in the selector lever positions D, R, and P, and driving with creep torque, are possible.

Another solution to the above task is achieved by means of a method for controlling the operation of a twin-clutch transmission of a motor vehicle, wherein the clutches and gearboxes of the twin-clutch transmission are shifted into conditions corresponding to the following pattern for the vehicle status "ignition off, engine off, and vehicle at rest":

Vehicle is at Rest with Ignition Off and Engine Off

| Vehicle Status: | Ignition off<br>Engine off<br>Vehicle at rest | | | |
| --- | --- | --- | --- | --- |
| | Selector Lever | | | |
| | D | R | N | P |
| Transmission 1 | N | N | N | N P active |
| Transmission 2 | N | N | N | N P active |
| Clutch 1 | Engaged | Engaged | Engaged | Engaged |
| Clutch 2 | Engaged | Engaged | Engaged | Engaged |

Irrespective of the selector lever position, in this situation the clutches are engaged and/or power is off and both gearbox units are shifted into neutral. Also, during the change of the selector lever position after the ignition is off, for example from D to R or from P to D, both gearbox units remain in neutral and no actions occur.

When the ignition is shut off in the D or R position, gears 1 and 2 or R are not maintained, but both gearbox units are shifted into neutral and the clutches are subsequently engaged. Otherwise (the gears remain engaged and the clutches remain engaged), the vehicle would be stopped due to the engaged drive train and the engine braking torque, and that would suggest to the driver a safe stop of the vehicle. To safely park the vehicle, however, only the "P" position is provided.

To ensure that the vehicle is in fact shut off in the "P" position, the driver can be forced, for example, by means of a "keylock"—i.e., the ignition key can be pulled only when the "P" position has been engaged—to turn off the vehicle in P. Only the transmission control system can activate or deactivate the keylock functionality, as only the transmission control system has information on whether the parking brake is actually engaged or disengaged.

A second variation for leaving the vehicle in the "P" position includes an "auto P-function" in which, after pulling out the ignition key, the parking brake is activated automatically. The disadvantage of that auto P-function is that the driver is given the impression of automatically leaving the vehicle in a safe state simply by pulling out the ignition key. Should the transmission actuator system fail in the auto P-function and the parking brake not be engaged when pulling out the key, the driver leaves his vehicle in an unsecured state, which could be considered critical to safety.

As the parking brake is engaged by the transmission actuator system, both variations, keylock and auto P-function, require follow-up by the control device until the selector lever is in P and/or the key has been pulled out, which under some circumstances could take several hours. At the same time, a failure of the transmission actuator system would lead to a situation in which the parking brake is not engaged. In such a situation, in the case of the keylock, the ignition key cannot be pulled out, i.e., the driver would have to leave the vehicle unlocked. In this example, a timer could deactivate the keylock function after a certain time period and release the ignition key. The driver can be informed of the time remaining to the end of the keylock function by means of the display.

With an "ignition off" status, the vehicle is always turned off with both gearbox units in neutral. Through the active interlock system, different strategies for shifting to neutral are possible, which differ in their level of confidence of actually having engaged the neutral state. With the "ignition off" status, the transmission will be shifted into neutral with a "High Confidence Neutral", i.e., both gearbox units are shifted into neutral by the active interlock regardless of engaged gears and/or previous actions. Prior to that, the shift finger would be moved to the reference position and hence the path measurement of the transmission actuator system would be newly adjusted. Contrary to a simple neutral status, in which a gear is disengaged solely based upon the knowledge that it is currently engaged without previously having performed a referencing operation, the probability that the transmission was, in fact, shifted into neutral is greater with a "High Confidence Neutral." The longer procedure for engaging neutral is not time critical in this state of the vehicle with "ignition off". In a similar manner, the transmission actuator can first conduct a referencing operation upon every engagement and release of the parking mechanism.

After shifting to neutral, the two clutches are slowly engaged in a time-shifted manner. The reason for this is that, if the clutches are rapidly engaged, both gearbox units could have one gear or both gears engaged when the vehicle is not at rest. A fast engagement of the clutches could lead to a relatively high drive train torque when both gearbox units constrain each other, or when the braking torque of the engine takes effect, which can lead to a dangerous driving situation. In a similar manner, it must be ensured that the internal combustion engine in fact no longer rotates, i.e., the engine control must send the engine rotational speed, or only shut off when the engine is actually at rest. Only then can the clutches be engaged.

Another solution to the above-identified object is achieved by means of a method for controlling the operation of a twin-clutch transmission of a motor vehicle, wherein the clutches and gearboxes of the twin-clutch transmission are shifted into conditions corresponding to the following pattern for the vehicle status "ignition on, engine off, and vehicle at rest":

Vehicle is at Rest with Ignition on and Engine Off

| Vehicle Status: | | Ignition on<br>Engine off<br>Vehicle at rest | | |
|---|---|---|---|---|
| | | Selector Lever | | |
| | D | R | N | P |
| Transmission 1 | N | N | N | N P active |
| Transmission 2 | N | N | N | N P active |
| Clutch 1 | Disengaged | Disengaged | Disengaged | Disengaged |
| Clutch 2 | Disengaged | Disengaged | Disengaged | Disengaged |

Irrespective of the selector lever position, in this situation both clutches are disengaged and both gearbox units are in neutral.

In this vehicle status, the driver is typically in the process of starting the vehicle, i.e., he is coming out of the above-described condition "vehicle is at rest with ignition off and engine off." When the ignition is turned on, both clutches are disengaged and both gearbox units should be in neutral. The first action to be performed is a referencing operation of the path measurement of the transmission actuator(s). No further action on the part of the transmission actuator (release of the parking brake, for example) occurs until that referencing operation has been completed. With the clutches disengaged, in the "P" selector position the starter is released and the engine can be started. If, contrary to assumption the drive train were engaged (one or both clutches were not disengaged and a gear was engaged in one or both gearbox units), the parking brake would nevertheless stop the vehicle from moving when the starter is actuated. This situation is therefore not critical to safety.

When the selector lever is in N, upon the referencing operation, a check is first made to ascertain whether both gearbox units are in fact in neutral, as in this case as well it cannot be excluded that a gear is accidentally engaged in one or both gearbox units and the clutches may be engaged. Otherwise (drive train engaged), the vehicle would move unexpectedly when starting it in N, which should be considered critical to safety. The starter is only released even in N after the neutral status has been verified.

If the request to disengage the parking brake (change of the selector lever from P to N, D, or R; only possible with brake pedal pushed down) occurs while the gear transmission actuator performs the referencing or neutral verification operation, the referencing operation of the transmission actuator is completed in any case before the parking brake is released. If the transmission actuator is just in the process of verifying the neutral position of the two gearbox units, the neutral verification operation is interrupted by the change in the selector lever position, the parking brake is released, and the neutral verification process subsequently continues.

With a shift into the selector lever positions D and R, only the parking brake is released; the two gearbox units, however, remain in neutral. Without the engine running and with the vehicle at rest, those positions, in any case, do not make sense. The transmission control system, however, must know with certainty that the engine is, in fact, off and that the vehicle is at rest, and for that reason communication to the engine control device must exist and the wheel rotational speeds must be available (see "tow starting the vehicle" below).

If the engine is not started directly, the clutches remain disengaged because, in release systems with hydraulic pressure transmitting paths, the periodic balancing function must be performed.

Another solution to the above-described task is achieved by means of a method for controlling the operation of a twin-clutch transmission of a motor vehicle, wherein the clutches and gearboxes of the twin-clutch transmission are shifted into conditions corresponding to the following pattern for the vehicle status "ignition on, engine off and vehicle in motion":

Vehicle is in Motion with Ignition on and Engine Off

| Vehicle Status: | | Ignition on<br>Engine off<br>Vehicle in motion | | |
|---|---|---|---|---|
| | | Selector Lever | | |
| | D | R | N | P |
| Transmission 1 | 1/3//5/7 or N | N | N | N ignore P |
| Transmission 2 | 2/4/6 or N | R | N | N ignore P |
| Clutch 1 | Undetermined | Undetermined | Disengaged | Disengaged |
| Clutch 2 | Undetermined | Undetermined | Disengaged | Disengaged |

For this vehicle status, no standard strategy for the clutches and the gearbox units exists.

A typical scenario for this vehicle status is the failure (for example empty tank) or a stalling of the engine during travel in D or R. With an engaged clutch and a traveling vehicle, the engine would still rotate and the engine control could send the engine rotational speed; the engine torque could either send a braking torque or be sent as invalid. In this case, the transmission control system can use a standby map for the engine torque and would continue traveling with possibly changed shift characteristic curves. The transmission control system would perform normal shifts during a change in gears (based upon the transmitted engine braking torque or a standby value), which are not comfortable but can be carried out. When the vehicle slows down and the engine rotational speed drops below the idle speed, the clutch of the active part would be disengaged pursuant to the control strategy of the twin-clutch transmission. In this case, the engine rotational speed immediately drops to zero and the clutch remains disengaged. When the vehicle comes to a standstill, both gearbox units are shifted into neutral (see vehicle status "vehicle at rest with ignition on and engine off"). If the vehicle were now to start rolling in D, neutral would remain engaged and both clutches would remain disengaged.

Another feasible scenario would be a situation in which the selector lever is in N and the vehicle is being towed. In this case, both gearbox units are in neutral; the clutches could be engaged or disengaged.

If P is requested while the vehicle is traveling, the transmission control system can ignore that request when the vehicle speed exceeds a threshold, because the parking brake will not become active—for example, due to a ratchet in the toothed wheel. The display must inform the driver of the incorrect request for P and the conditions required for engaging the parking brake. When the vehicle speed is below the threshold value, which is, for example, 3 to 5 km/h, the parking brake is engaged and the selector lever position P will be indicated.

A significant advantage of a twin-clutch transmission over a torque converter is the possibility of tow-starting the vehicle and starting the engine in that way. The tow-starting function can be activated by a shift of the selector lever from N to D above a speed $V_1$. When the vehicle travels in N at a speed greater than $V_1$ and the ignition is turned on, both gearbox units are in neutral and the clutches are disengaged. If a shift to D now occurs, the gears in both gearbox units are engaged in accordance with the travel speed and the clutch of the active part is slowly engaged. The engine should then start running, and the vehicle will be in a normal driving operation. If the engine does not start and the vehicle becomes slower from towing, a gear change into a lower gear occurs. If such a change in torque flow is performed from one gearbox unit to the other, the clutch control must perform an overlap shift without support from the internal combustion engine. The tow-starting function should also be possible in the manual jogging mode, in which the driver can select the corresponding gear for tow-starting himself. Should the tow-starting process not be successful and the vehicle speed drop so far that the engine speed is below the idle speed, the clutches are again disengaged. When the vehicle comes to a standstill, the two gearbox units are again switched to neutral, even if the selector lever is still in D. If the vehicle starts rolling again in the "D" position and exceeds the speed $V_1$, neutral will remain engaged and the clutches remain disengaged and no tow-starting will occur. The tow-starting function is only possible with the change from N to D. Theoretically, the tow-starting function is also possible with the shift from N to R. However, that should only be considered as an option.

Due to the selection of the clutches as a function of the vehicle speed, the wheel rotational speed signals must exist on a permanent basis for "ignition on."

Another solution to the above-described task is achieved by means of a method for controlling the operation of a twin-clutch transmission of a motor vehicle, wherein the clutches and gearboxes of the twin-clutch transmission are shifted into conditions corresponding to the following pattern for the vehicle status "ignition off, engine off and vehicle in motion":

Vehicle is in Motion with Ignition Off and Engine Off

| Vehicle Status: | Ignition off Engine off Vehicle in motion | | | |
|---|---|---|---|---|
| | Selector Lever | | | |
| | D | R | N | P |
| Transmission 1 | N | N | N | N ignore P |
| Transmission 2 | N | N | N | N ignore P |
| Clutch 1 | Engaged | Engaged | Engaged | Engaged |
| Clutch 2 | Engaged | Engaged | Engaged | Engaged |

In this vehicle status, both gearbox units are shifted into neutral and both clutches are slowly released from any loads, regardless of the selector lever position.

A prerequisite for this is that the transmission control system can detect whether the vehicle is moving or not, i.e., whether or not wheel rotational speed exists.

If the ignition is turned off during travel, both gearbox units are still shifted into neutral, and subsequently both clutches are slowly engaged. As an additional safety feature, the engine speed can be monitored (provided that the engine control still transmits that information) during engagement of the clutches, in order to detect a gear that may still be engaged. As in the above embodiments, in this case as well, the activation of the parking brake through the selector lever in P should be ignored above a speed threshold VP. Therefore, the wheel rotational speed signals must be available to the transmission control system even in the case of "ignition off." If the wheel rotational speed signals are not available to the transmission control system, the parking brake is engaged and ratchets through the toothed wheel. If the transmission control system is no longer in followup mode and has already shut down, P will be ignored, i.e., the driver must turn the ignition back on in order to be able to engage P.

When the vehicle has come to a standstill, the gearbox units are in neutral and both clutches are engaged (see vehicle status "ignition off, engine off, and vehicle at rest"). Without having to activate the parking brake, the transmission control system could shut down in this state and no longer perform any actions. However, since the parking brake is activated by the transmission control system, the control device must continue to remain turned on until the parking brake has in fact been engaged. Therefore, the control device cannot be shut off in the selector lever positions D, R, and N, as the driver could still possibly request the selector lever position P at any time.

The following scenarios are possible with the keylock and auto P-function variations:

a) The transmission control system with the keylock remains active until the driver shifts the selector lever to P and the ignition key can be pulled out. The wheel rotational speed signals must likewise be available during this time. The display for indicating the selector lever position and the selector lever itself would also have to be turned on until P has been engaged. In the most unfavorable case, that can take hours or days—in any case, only as long as the battery provides sufficient power.

b) The transmission control system with the keylock remains active until the driver shifts the selector lever to P and the ignition key can be pulled out. If P is not engaged after a certain period of time, for example, 30 minutes, the parking brake automatically comes on and the control device shuts off. Only then can the wheel rotational speed signals as well as the display for indicating the selector lever position and the selector lever be shut off. With this function, the parking brake would be engaged even in the "N" position after a predetermined time period, which under some circumstances would be unfavorable when trying to tow-start the vehicle. In any case, however, it must be possible to disengage the parking brake again by means of a mechanism that can be actuated manually, for the case that the vehicle is supposed to be towed with a dead battery.

c) With the status "ignition off", the parking brake is always (regardless of the driving situation) engaged automatically (with a time delay of a few minutes), and subsequently the control device is shut off. That can be indicated through a warning signal or a message on the display. The auto P-function is thus activated by pulling the ignition key out or by "ignition off".

Another solution to the object of the invention is achieved by means of a method for controlling the operation of a twin-clutch transmission of a motor vehicle, wherein the clutches and gearboxes of the twin-clutch transmission are shifted into conditions corresponding to the following pattern for the vehicle status "ignition on, engine on, and vehicle in motion":

Vehicle is in Motion with Ignition on and Engine on

| Vehicle Status: | Ignition on Engine on Vehicle in motion | | | |
|---|---|---|---|---|
| | Selector Lever | | | |
| | D | R | N | P |
| Transmission 1 | 1/3//5/7/N | 1/N | N | Ignore |
| Transmission 2 | 2/4/6/N | R | N | Ignore |
| Clutch 1 | Controlled | Controlled | Disengaged | Disengaged |
| Clutch 2 | Controlled | Controlled | Disengaged | Disengaged |

The above-identified vehicle status corresponds to the normal driving situation. Clutches and gearboxes are controlled in accordance with the driving situation pursuant to the twin-clutch transmission control strategy. A shift of the selector lever to P is ignored during travel (implementation, for example, by means of shift-lock on the selector lever or indication on the display).

The above-explained actuation strategies were conducted under the assumption of a clutch actuator system with a hydraulic pressure transmission path. A purely mechanical release system would not lead to any significant differences. Only the periodic balancing operation is no longer required. Additionally, there is an option of also keeping the clutches disengaged, with the ignition turned off and the vehicle at rest. However, that can lead to problems during assembly or disassembly of the clutch because the disk spring is permanently biased to provide the release force. The above strategies are also applicable for twin-clutch transmissions with an external parking brake, apart from the transmission actuator actions for the parking as such (e.g., follow-up time of the transmission control device for selecting the parking brake).

Figure 2:
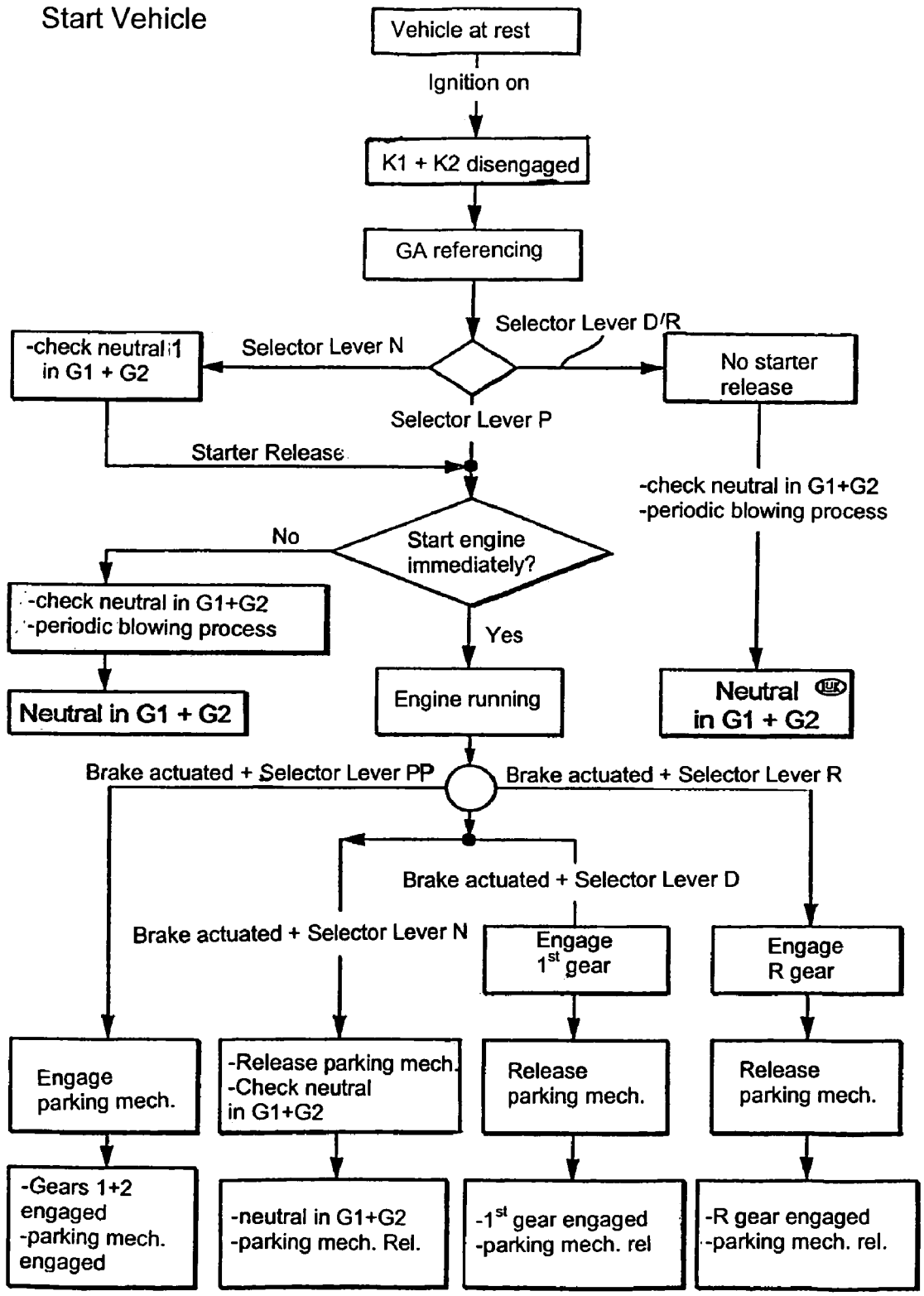
FIGS. 2 through 5 show block diagrams of methods in accordance with the present invention for operating a drive train of the type shown in FIGS. 1a and 1b.

The attached FIG. 2, by means of a flow chart, shows a summary of the course of transmission control when starting a motor vehicle, beginning with the vehicle at rest. The vehicle is equipped with a twin-clutch transmission having the clutches K1 and K2 and the gearbox units G1 and G2. The clutch actuation contains a hydraulic pressure transmission path, i.e., relief is required. GA represents the transmission actuator or transmission actuators. For reasons of clarity, the individual boxes have been labeled directly, so that a repetition of the flow chart from FIG. 2 in a full text version has been rendered unnecessary.

Figure 3:
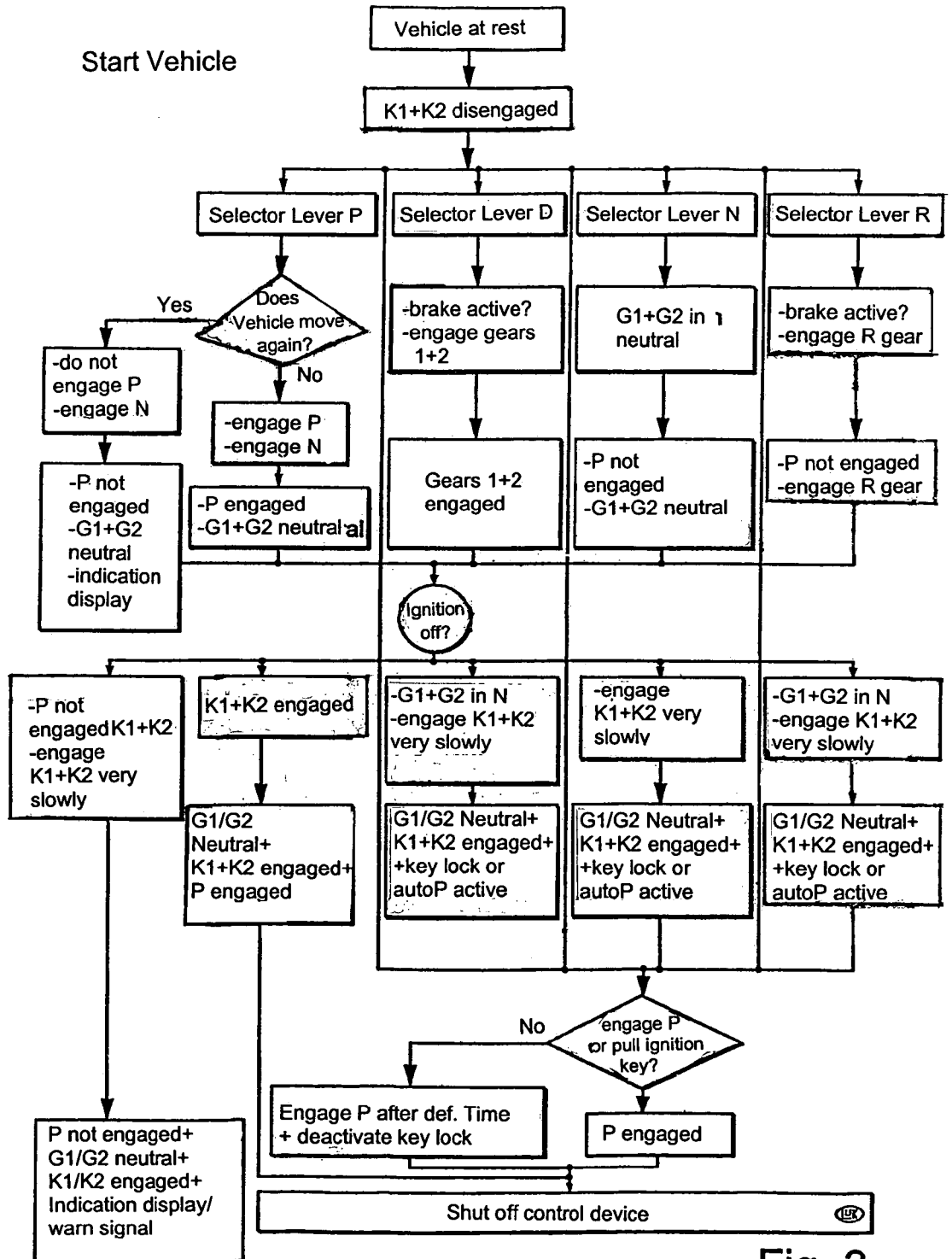

The attached FIG. 3 shows in a flow chart similar to FIG. 2 the process of shutting the vehicle off, beginning with the vehicle at rest.

Figure 4:
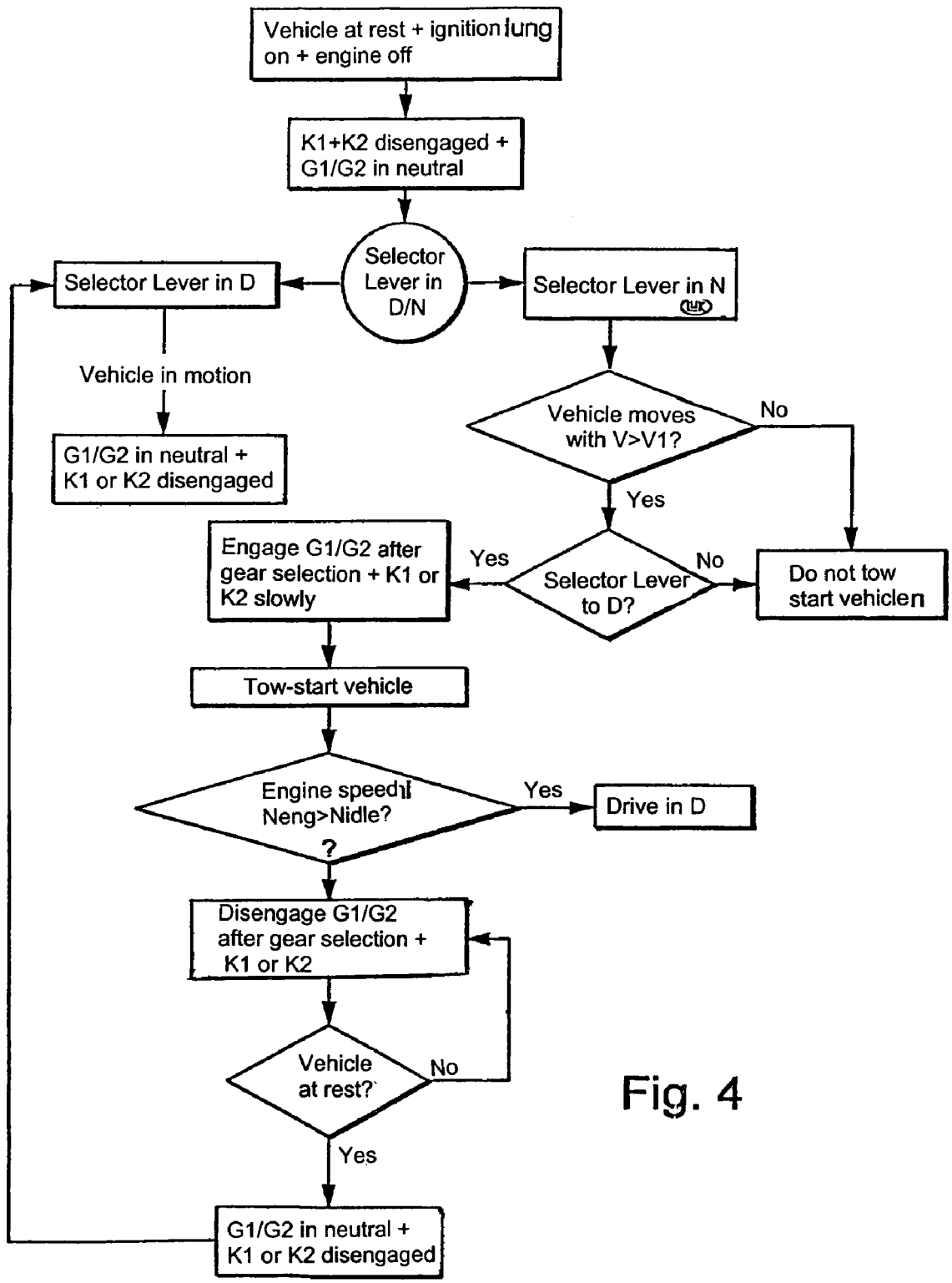
Figure 5:
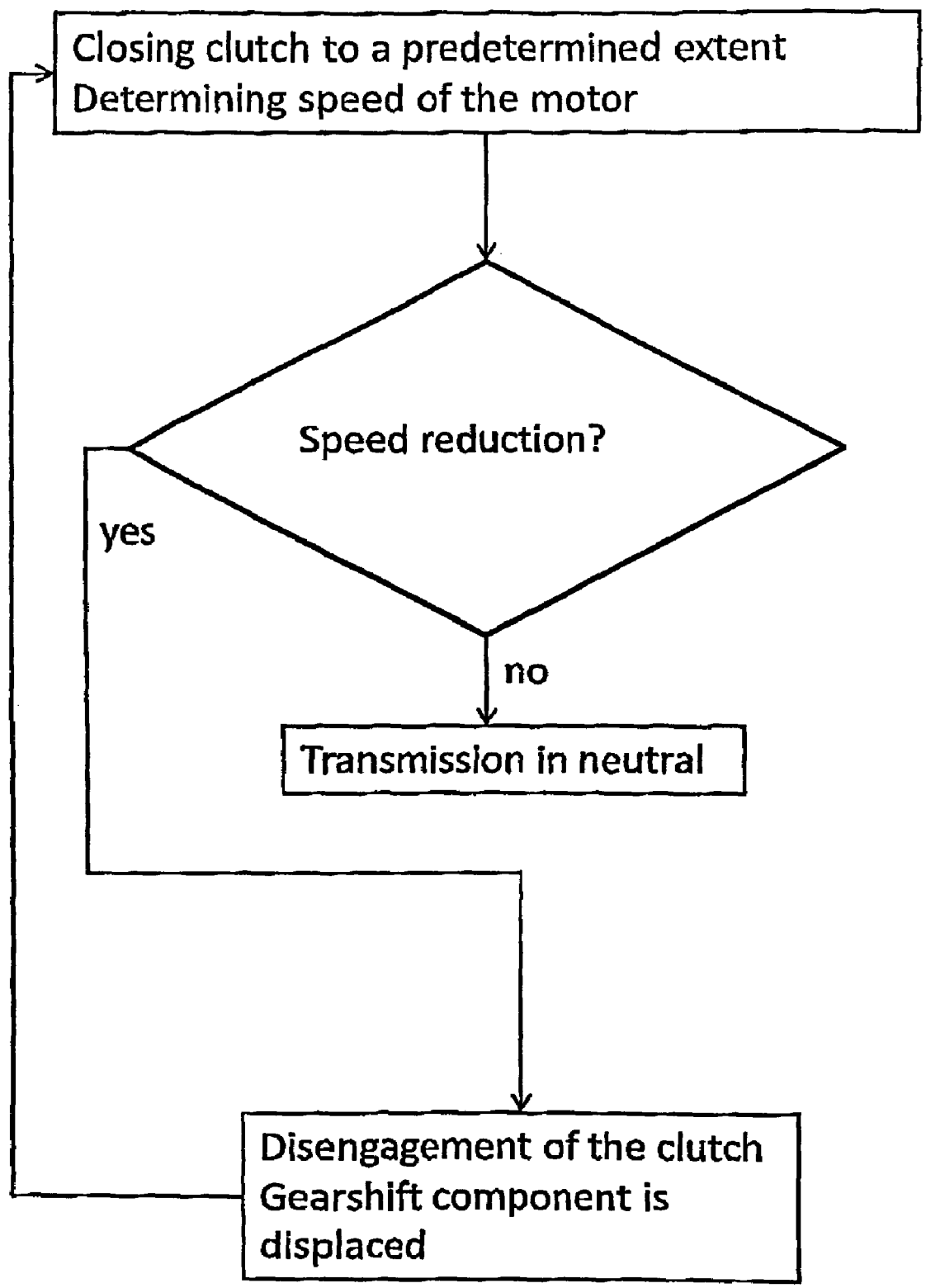

FIG. 4, which is similar to FIGS. 2 and 3, is a flow chart of the tow-starting process of the vehicle, beginning with the vehicle at rest, ignition on, and engine off.

Another problem arising for vehicles equipped with twin-clutch transmissions is as follows:

The control device 60 embodies a strategy according to which not only the next engaged gear of a gearbox unit but also the subsequent gear of the other gearbox unit are pre-selected and/or pre-determined. That process is meant to minimize the time until the gears are shifted. Active interlock systems additionally include the concept of a waiting position, which can be selected independently from the currently engaged gear. A good selection of the waiting position minimizes the actuator activity required for the next gear selection and/or gear shifting operation.

The "future" gear can be selected, for example, on the basis of the engine rotational speed. When the engine rotational speed is high, for example, the future gear is selected so that it corresponds to the presently engaged gear +1 (for example, if $2^{nd}$ gear engaged, the future gear is $3^{rd}$ gear). When the engine rotational speed is low, the future gear is selected in accordance with the engaged gear −1. When the engine rotational speed is in the middle range, no clear pre-selection can occur.

A disadvantage of that strategy lies in the fact that the actual driving profile is such that, in numerous situations, the pre-selection is not used, i.e., engagement of the pre-selected gear was in vain, resulting in unnecessary wear on the corresponding synchronization system and the shift actuator. One example of such a wasted pre-selection is, for example, when the pre-selected gear is equal to the engaged gear +1, but the driver then selects a downshifting mode.

A solution according to the invention to the problem of minimizing futile pre-sections is provided by means of a method for controlling the operation of a twin-clutch transmission, including the following steps:

shift the non-coupled transmission into a pre-selection gear according to a program including a gear of the coupled transmission and at least one additional operating parameter of the vehicle drive train, verify whether the pre-selected gear indicated by the program is, in fact, engaged during the subsequent shift of the twin-clutch transmission into another gear, determine a success factor that corresponds to the ratio between the gear number in which the pre-selection gear is actually shifted and the number of subsequent shifts, and change the program when the ratio is below a predetermined value.

The adaptive technique in accordance with the present invention allows the pre-selected shifts to be modified based on a determination of the number of futile pre-selections.

Let us assume that the service life of the actuator and the synchronizing system have been designed on the basis that 30% of the pre-selections are in vain. During operation, the success rate of the pre-selections can then be monitored and the pre-selection strategy can be modified when the ratio of the actually shifted pre-selection gears to the total number of subsequent shift operations drops below 0.7.

The success probability of the respectively adapted pre-selection program can be monitored continuously. Experience has shown that the adaptation leads to an increase in the success probability, i.e., the service life of the transmission increases. Comfort is also improved, as shifts with the correct pre-selection are especially comfortable. Obviously, each gear can be assigned a separate success factor and/or a pre-determined value.

A system for controlling at least one actuator in the drive train of a motor vehicle includes at least one sensor for detecting a variable that influences the control of the actuator, a control device having an input to which the output signal of the sensor is fed, a data processing device, and an output for selecting the actuator, is characterized in that the data processing device operates such that at least one of the above-described methods is performed.

Obviously, the invention can also be applied in systems that have been modified from the system illustrated in FIG. 1a. The transmission control device 60 can be functionally divided into different units, wherein the units can communicate with each other via a bus system. The twin-clutch transmission, to the extent that it is not required for execution of the present invention, can be replaced with a single clutch transmission.

The following patent claims include proposed formulations, without prejudice for achieving farther-reaching patent protection. The applicant reserves the right to claim additional feature combinations that are disclosed only in the description and/or the drawings. References used in the dependent claims refer to the further development of the object of the independent claim through the features of the respective dependent claim; they shall not be interpreted as a waiver for achieving independent protection for the feature combinations of the dependent claims. Since the objects of the dependent claims with respect to prior art can constitute autonomous and independent inventions on the priority date, the applicant reserves the right to make them the object of independent claims or separating declarations. They can, moreover, also contain independent inventions that include a design that is independent of the objects of the preceding dependent claims.

The exemplary embodiments should not be interpreted as a restriction of the invention. Rather, within the framework of the present disclosure, numerous variations and modifications are possible, especially such variations, elements, and combinations that can be obtained e.g., by modifying individual features and/or elements that are described in connection with those of the general description and embodiment, as well as in the claims, and that are contained in the drawings, or by modifying the procedural steps by those skilled in the art in light of the solution of the object or the achievement of benefits, and which can lead to a novel object or to novel procedural steps and/or step sequences by features that can be combined.

Obviously, the above-described control methods in accordance with the invention are especially advantageous in drive trains with "active interlock" systems. They exhibit benefits in connection with the use of incremental path sensors that are provided on the actuating elements, over the use of conventional absolute path sensors, and/or actuators provided separately for each drive branch. Those benefits are, in particular, the saving of components and the simpler referencing and control processes.

What is claimed is:

1. A method for determining whether a motor vehicle transmission that is connected to an engine via a clutch that is actuated by a clutch actuator has been shifted into a neutral gear when the vehicle is at rest with a disengaged clutch, said method comprising the steps of:
   a) engaging the clutch from its disengaged position to a predetermined extent,
   b) determining engine rotational speed during engagement of the clutch,
   c) interpreting an engine rotational speed reduction as a transmission that is not in neutral and renewing disengagement of the clutch, and
   d) interpreting an absence of an engine rotational speed reduction as a transmission that is in neutral, and
   e) repeating steps a) through d) continuously and after each step d) displacing a gearshift component of the transmission by a predetermined amount until step d) has been satisfied.

2. A method according to claim 1, wherein the transmission is a twin-clutch transmission.

3. A method according to claim 2, including the steps of: referencing a component in a vehicle that is moved by a component actuator, detecting movement of the component relative to a reference position, and moving the component by the component actuator into its reference position when a control element of the vehicle that is actuated during normal operation at a time prior to the component actuator activity is actuated.

4. A method according to claim 3, wherein the component that is moved in its reference position is a control element of a clutch.

5. Method A method according to claim 3, wherein the component that is moved in its reference position is a control element of a transmission.

* * * * *